United States Patent [19]

Wintenberger

[11] 4,456,480
[45] Jun. 26, 1984

[54] PROCESS FOR PURIFYING METALS BY SEGREGATION

[75] Inventor: Michel G. Wintenberger, Paris, France

[73] Assignee: Pechiney, France

[21] Appl. No.: 479,492

[22] Filed: Mar. 28, 1983

[30] Foreign Application Priority Data

Mar. 30, 1982 [FR] France .................. 82 05826

[51] Int. Cl.³ .................. C22B 9/02; C22B 21/06
[52] U.S. Cl. .................. 75/63; 75/67 A;
75/68 R; 75/78; 75/86; 423/348
[58] Field of Search .............. 75/63, 68 R, 78, 86,
75/67 A; 423/348

[56] References Cited

U.S. PATENT DOCUMENTS 3,671,229 6/1972 Ferber et al. .................. 75/63
4,294,612 10/1981 Dawless et al. .................. 75/10 R

*Primary Examiner*—M. J. Andrews
*Attorney, Agent, or Firm*—McDougall, Hersh & Scott

[57] ABSTRACT

The present invention relates to a process for purifying metals, such as aluminum, by segregation, wherein, by controlled cooling in the upper part of a volume of liquid metal to be purified, which is contained in a crucible and disposed in a furnace, small crystals are caused to form, the crystals falling towards the bottom of the container under the force of gravity. The small crystals are compacted so as to cause the formation of a compact layer of large purified crystals.

This process is distinguished from the known processes in that, to enhance the purification effect, the thermal flux is so adjusted as to completely and progressively re-melt the lower part of the mass of large crystals which are formed, with the re-melting action being propagated upwardly so as permanently to maintain a layer of large crystals which separates the re-melted liquid entirely disposed in the lower part from the remaining mother liquor.

That process makes it possible to attain extremely high levels of purification, in relation to very high fractions of the initial mass of aluminum which is to be purified. The process can be applied to metals such as aluminum, lead, zinc, magnesium and silicon containing eutectic impurities in hypoeutectic amounts.

7 Claims, 1 Drawing Figure

PROCESS FOR PURIFYING METALS BY SEGREGATION

BACKGROUND OF THE INVENTION

The present invention relates to a process for purifying metals by segregation, which can be applied in particular to aluminum.

In different technical fields, and in particular in regard to the production of high and medium voltage type electrolytic capacitors, there is an increasing tendency to use aluminum which contains only a few parts per million of impurities such as iron and silicon.

It is known that aluminum which is produced by the electrolysis of alumina may have a level of impurities concentration of the order of several hundreds of parts per million. It has, therefore, been found necessary to be able to provide processes which permit very pure aluminum to be produced.

One of those processes comprises refining the aluminum in the presence of copper by a process referred to as "three-layer electrolysis." However, that process suffers from the disadvantage of being relatively expensive to work and not always effective to produce a sufficient degree of purity in respect of certain elements, in particular iron and silicon.

Another process involves segregation, which operation comprises effecting cooling to cause partial crystallization of a molten metallic mass, then separating the solid phase, which is purified in respect of certain elements referred to as eutectic elements, from the liquid phase which is enriched in respect of the same elements.

The present invention lies in the second line of development. Eutectic elements such as iron, silicon, copper, magnesium and zinc all have the characteristics of forming with aluminum and with a given level of concentration, alloys which are referred to as eutectic alloys. The solidification temperature of these alloys, when they are cooled from the liquid state, is lower than that of pure aluminum.

If liquid aluminum containing such elements in amounts less than the eutectic concentration is subjected to cooling, it is known that the aluminum crystals which appear within the mother liquor are purer than the latter. Such a phenomenon is described by means of liquid-solid binary equilibrium diagrams which indicate, in the temperature range in which the two phases exist and for a given base metal-eutectic element pair, the concentration $C_S$ at which that element occurs in the solid when it is in condition of equilibrium with a liquid in which it occurs in a level of concentration $C_L$. The ratio $k=C_S/C_L$ which is lower than 1, referred to as the partition coefficient, is characteristic of each eutectic element and has very little dependency on its concentration in the alloy.

In practice, if $C_O$ is used to denote the concentration in the metal to be purified in respect of each of said impurities, a product in which that concentration is adjusted to C is obtained in the purified phase. The level of efficiency of the operation is generally indicated by the purification coefficient corresponding for each impurity to the ratio $C_O/C$.

Processes based on such principles have already been patented. In the embodiments of those patents, it is found that the purification coefficients achieved are higher than those which are deduced from the partition coefficients. This results, surprisingly, because, when those processes are applied, they use complementary means, the effect of which is to modify the equilibrium states and thus improve the purification effect.

In particular, U.S. Pat. No. 3,303,019 filed in 1964, concerns a process wherein a molten mass of aluminum is poured into an unheated container, the side walls and the bottom of which are so designed as to limit thermal losses. The container is open in its upper portion, the bottom thereof is substantially flat, the side walls are vertical, and it is provided with a tapping orifice. The dimensions of the container are such that, for a charge of 700 kg, the metal occupies a height of 37.5 cm and has an area of contact with air of 8700 $cm^2$, giving a ratio of 4/1000 between those two parameters. By removing the heat of solidification at the contact surface, crystallization is initiated. During that fractionated crystallization, the bed of crystals which is formed in the lower part of the container is subjected to a pressure which is applied intermittently by a vertically moving rammer member. At the end of the crystallization procedure, that is to say, when about 70% of the mass has crystallized, the tapping orifice is opened and about 12% by weight of the initial mass is discharged in the form of mother liquor. A heat flux is applied to the surface of the mass of crystals so as to cause remelting, and then in succession there is removed 16.6% of liquid, with the tapping orifice being fully open, followed by 40%, with the speed of removal being reduced, and finally, the remaining 31.4%. This last removal of material provides a metal containing 30 ppm of silicon and 10 ppm of iron, while the starting material contained 420 and 280 ppm respectively; that corresponds to purification coefficients of 14 for silicon and 28 for iron. As it is known that the coefficients of partition of silicon and iron are about 0.14 and 0.03, it is deduced therefrom that the degree of purification in respect of iron is slightly lower than that corresponding to the partition coefficient (1/0.03=33), but in contrast, purification in respect of silicon is about twice that value (1/0.14≈7).

French Pat. No. 1,594,154 filed in 1968 discloses a purification process which comprises:
- causing progressive solidification within a volume of liquid metal which is maintained in the region of its melting point in an externally heated container, by immersing an internally cooled body therein,
- collecting all the small crystals which are formed, at the bottom of the container,
- causing the formation of large crystals which are about 1 cm in diameter, within which are observed cells, the dimensions of which, being close to 1 mm, led to the assumption that they are the traces of small crystals, during which phenomenon the mother liquor is progressively displaced upwardly in the container, and
- separating the purified large-crystal fraction from the fraction which is enriched in respect of impurities.

As shown in the drawings of this patent, the ratio of the height to the cross-section of the container used is substantially higher than that disclosed in the above-quoted U.S. patent.

Operating examples taken from the French patent may be summarized as follows:

(1) Starting with aluminum containing 320 ppm of silicon and 270 ppm of iron, there is produced a purified fraction representing 70% of the initial mass of aluminum. This fraction contains 20 ppm of silicon (that is to say, a purification coefficient of 16), and 15 ppm of iron (that is to say, a purification coefficient of 18). It may be noted that this operation has a very high yield (70%) resulting in purification coefficients which are themselves very high, that of silicon being higher than that given by the partition coefficient of that element.

(2) Starting with aluminum containing 620 ppm of silicon and 550 ppm of iron, a purified fraction containing 40 ppm of silicon and 10 ppm of iron was produced, the fraction comprising 50% of the initial mass of metal. The stated proportions of silicon and iron in the purified fraction represent purification coefficients of 15.5 in respect of silicon and 55 in respect of iron. It will be seen, therefore, that, in comparison with U.S. Pat. No. 3,303,019, French Pat. No. 1,594,154 makes it possible, with higher yields (50% instead of 30%), to produce a metal with higher purification coefficients: 15.5 instead of 14 in respect of silicon and 55 instead of 28 in respect of iron.

It will also be seen that, in regard to silicon and iron, the purification coefficients are markedly higher than those which are deduced from the partition coefficients. That result is all the more surprising since, as the small crystals which are formed are purer in respect of eutectic elements than the liquid, the liquid becomes enriched in respect of impurities as the crystallization process progresses, which should result in less advanced purification of the crystallized mass.

That result was studied and described in Revue de l'Aluminum (May 1974, page 290) as resulting from a procedure of "successive in situ re-melting steps".

Moreover, a prior publication by one of the authors of French Pat. No. 1,594,154, in Compte-Rendus de l'Academie des Sciences de France (volume 272, page 369, series C, 1971) showed that an impure metal placed in a temperature gradient covering the gap between the solidus and the liquidus tends in a few minutes to assume the state of equilibrium, by a process of melting and solidification phenomena, the state of equilibrium being achieved when, in the gap between the solidus and the liquidus, the metal is completely solid with levels of impurity concentration equal to those given by the solidus at the local temperature.

That shows that the small crystals which are initially formed from the mother liquor have a tendency, after settling, to assume the composition which is given by the solidus at the temperature at which they are. These crystals therefore undergo purification with respect to the initial level of concentration, if they are at a temperature that is higher than the temperature at which they were formed. This is possible since the container in which they are is heated in such a way that, before the cooled body is introduced, the mass of aluminum is in a completely molten state.

U.S. Pat. No. 4,221,590 filed in 1978 uses the same means as those described in U.S. Pat. No. 3,303,019, but with the addition of the step of heating the bottom and the walls of the container. According to this later patent, that partial re-melting step makes it possible to restore equilibrium in respect of the concentration of the small crystals, to improve the levels of performance, and to achieve purification coefficients which are higher than those that are deduced from the partition coefficients. As indicated above, the result was already achieved in the other patents quoted.

However, if we look at FIG. 2 of U.S. Pat. No. 4,221,590, which gives the results of purifying silicon in dependence on the amount of aluminum removed from the crystallization unit, it is found that the improvement over the prior U.S. patent relates in particular to the first 40% of the purified mass, the proportion of which seems to go from 250 ppm to 100 ppm approximately. In contrast, in regard to the remaining 30%, the proportion is substantially the same, in the region of 20 to 30 ppm. It is also stated that very high levels of purity of the order of 3 ppm of Fe are attained, but without specifying the amount of metal on which that result was achieved.

In summary, the two U.S. patents achieve yields and levels of purification inferior to those in the French patent. To the extent that very high levels of purity, higher than those described in the French patent, are achieved, these are accomplished using amounts of metal which are not specified.

To the extent that the complementary means of the three patents make it possible to achieve purification coefficients which are higher than those deduced from the partition coefficients, the part played by the complementary means must be considered. In the French patent, the purified metal is in the form of a compact mass of large crystals containing no, or virtually no, liquid. In contrast, it is stated in U.S. Pat. No. 4,221,590 on the one hand that the deposit of crystals is facilitated by the action of the rammer member which breaks up the massive formations of crystals and, on the other hand, that heating the bottom of the container prevents the liquid phase from congealing on the lower portion thereof. These are details which show that that process involves avoiding the formation of a solid, compact mass and in contrast maintains the presence of an intimate mixture of liquid and crystal.

Therefore, in the two processes concerned, operation is effected using purified masses which are very different in constitution; in the French patent, the mass used is virtually solid and compact, whereas in the U.S. patent the mass used is an intimate and non-compact mixture of solid and liquid.

SUMMARY OF THE INVENTION

The present invention proposes operating in a manner which is entirely different in that even if the general layout of the process of French Pat. No. 1,594,154 is used, the thermal flux applied to the metal is adjusted at each moment in such a way that, when the layer of large crystals has attained over its entire section a sufficient thickness such as not to be broken up by the compacting action, the large crystals are caused progressively to undergo re-melting. The re-melting starts from the base of the container and over the entire section thereof, with such progressive re-melting of the large crystals being propagated upwardly at a speed close to the speed of growth of the layer in its upper part. This maintains substantially the same thickness of large solid crystals between the subjacent liquid portion resulting from re-melting of the large crystals, and the upper portion of mother liquor to be purified.

The novel process, therefore, comprises purifying the metal by segregation, by generating a thermal flux for cooling in its upper portion a mass in a molten condition. The mass is contained in a container, and the process causes crystals progressively to occur within the liquid, said crystals being compacted downwardly in order to remove the intersticial liquid and to produce a layer of large crystals containing virtually no more liquid. In comparison with French Pat. No. 1,594,154, the process is characterized by the application of a thermal operating procedure which causes complete re-melting of the lower portion of the large crystals which are formed in the bottom of the container.

In the process, the above-mentioned re-melting phenomenon is not initiated as soon as the large crystals are produced. Instead, the re-melting step is delayed until there is a layer of sufficient thickness for it to be fluid-tight and to have a degree of rigidity such as not to break when it is disposed between two liquid portions and when it is subjected to the action of the rammer members which are intended for compacting the small crystals formed in the upper portions of the container. In fact, any hole or crack in the layer would result in direct exchange between the two liquid phases and would be extremely harmful to the level of efficiency of the purification operation.

When the layer has attained the required thickness, the thermal operating procedure adapted to cause the large subjacent crystals to be re-melted is initiated. As the growth of the layer of large crystals results from small crystals which are deposited by gravity on the upper part of the layer of large crystals, and from such small crystals spreading out, being compacted, and being "sintered" by rammer members which cover the entire deposit surface area, such growth takes place in a substantially horizontal plane. Where the layer is sufficiently thick, the thermal flux is then adjusted in such a way to re-melt the lower part of the layer regularly over its entire area. The thermal flux then develops its effect progressively upwardly at a speed corresponding to the speed of growth of the upper part of the layer of large crystals, in order to maintain that layer at the desired thickness.

Therefore, the container always contains a layer of large crystals, of constant thickness, which forms a barrier between the extremely pure liquid in the lower region (resulting from the re-melting step), and the impure liquid in the upper region, in which crystallization of the small crystals is initiated.

The operating procedure can be stopped at any moment. In that case, the impure liquid which is floating at the surface is then generally emptied out, while the liquid resulting from the re-melting step can be drawn off, and then the layer of large crystals can be recovered. In this way the whole can be left to solidify completely by cooling, and the purified fraction may be recovered by sawing operations. Alternatively, the purified fraction may be discharged in the form of a number of fractions.

The novel process makes it possible to achieve purification coefficients that are markedly higher than those attained in the French patent, with a very high yield.

The mechanism of the purification effect is not completely clear. It is suggested, however, that since the subjacent part of the layer of large crystals is subjected to re-melting to a thickness compatible with the appropriate level of mechanical strength, this permits the remaining layer of large crystals to be raised to the highest possible temperature and, from what has been stated above, in particular in the Compte-Rendu a l'Academie des Sciences, that this makes it possible to achieve the highest possible levels of purity.

The thermal flux for creating the re-fusion effect and for causing it to develop progressively upwardly can be produced by any known heating system. The system will require control means for providing pilot control of the speed at which the small crystals are formed, the speed at which the upperpart of the layer of large crystals rises, and the speed at which the large subjacent crystals are subjected to re-melting. These speeds are controlled in such a way as to maintain a suitable thickness of large crystals.

DETAILED DESCRIPTION OF THE INVENTION

Figure 1:
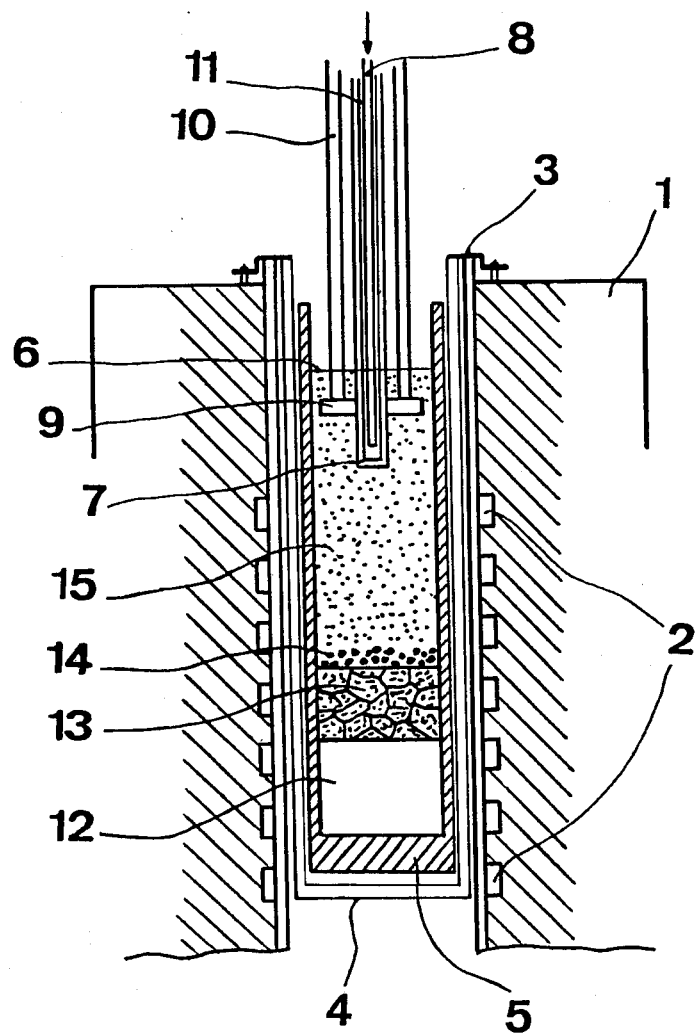
FIG. 1 comprises a vertical cross-sectional view of a furnace adapted for the practice of the invention.

The present invention will be better appreciated by referring to the accompanying drawing which shows a cross-sectional view of a possible embodiment of the purification apparatus as constructed in a laboratory.

Reference numeral 1 denotes a vertical furnace which is provided with heating elements 2 which are independent of each other. Disposed in the vertical furnace 1 is a stainless steel container 3 which is covered by heat insulation 4 and which contains a graphite crucible 5. The crucible is almost completely filled with metal to be purified, in the liquid state, up to the level indicated at 6. The means for heating the furnace is so regulated that the assembly comprising the crucible and the liquid metal is initially raised to a temperature T which is higher than the melting point of the metal to be purified.

The assembly 7, 8, 9 and 10 is referred to as the immersion assembly. The member 7 is blind graphite tube in which there is a compressed gas conduit 8. The assembly 7, 8 forms the cooling member. The tube 7 is surrounded by a graphite ring 9 provided with graphite rods 10 which issue from the bath and which permit the ring 9 to be slid along the tube 7.

At the beginning of the purification operation, the member 7 is introduced into the liquid, which permits the temperature of the metal to be lowered from the temperature T to the solidification temperature; the gas which is heated in contact therewith is discharged by way of the annular space 11. After a certain period of time, crystals are formed on the walls and the bottom of the tube.

By suitably selecting the heating output of the furnace, the outside dimensions of the tube 7, and the flow rate of the cold fluid in the conduit 8, it is possible to control the rate of removal of the heat and consequently to adjust the speed of solidifcation of the metal. A slow speed of solidification promotes purity of the crystals; the combination of the furnace and the immersion assembly therefore makes it possible to act thereon and to control solidification with a very high degree of convenience.

By lowering the graphite ring 9, the crystals which are formed on the cold walls of the tube 7 are detached by a scraper effect. The crystals, being denser than the liquid from which they were formed, fall to the bottom of the container. The ring 9, by means of a reciprocating movement, also serves for periodically compacting the crystals at the bottom of the container. The central part of the mass of crystals is compacted from time to time by means of the bottom of the tube 7.

The succession of operations as described above is repeated as often as deemed necessary. The tube 7 is progressively raised as solidification progresses. That, therefore, results, at the bottom of the container, in a layer of large crystals which are of diameters of the order of a centimeter. Study of the large crystals, after a sample thereof has been taken off, shows that they are formed of cells, the dimensions of which, being of the order of 1 mm, indicate that they are the traces of small crystals which were deposited.

When the layer of large crystals has reached a suitable thickness, which can be evaluated by virtue of the travel movement of the ring in the compacting operation, the thermal flux is adjusted by means of the heating assembly 2 so as to cause the large crystals to be completely re-melted, starting from the base of the container, and over the entire section thereof. The re-melting phenomenon is propagated progressively upwardly, while the immersion assembly continues to operate.

After a certain period of time, it is found that the container contains, in an upward direction, a liquid portion 12 resulting from the re-melting operation, which is in a very high state of purity, a layer of large crystals as indicated at 13, small crystals 14 which were deposited and which have not yet been transformed into large crystals, and the remaining mother liquor 15.

In order to interrupt the purification operation, the immersion assembly simply has to be withdrawn from the container and the heating means switched off. Then, either the liquid 15 is emptied out immediately, or it is left to solidify at the same time as the re-melted liquid 12. A mass is then collected, which can be sawn perpendicularly to its longitudinal axis to produce slices in different states of purity.

The following examples of use are set forth to illustrate the invention:

EXAMPLE 1

4 kg of aluminum containing 550 ppm of iron and 620 ppm of silicon is poured into an arrangement similar to that shown in the drawing, and regulation of the furnace is permanently maintained, with the upper part being cooled by a flow of nitrogen. Operation lasted for four hours and at that moment the upper part of the large crystal region attained 50% of the height of initial metal while the completely re-melted subjacent region represented 30% of the mass used. Analysis of the resulting product, performed by spectrography, gave the following results:

| on the large crystals | |
|---|---|
| in the bottom part of the layer: | |
| Fe | 5 ppm |
| Si | 25 ppm |
| in the top part of the layer: | |
| Fe | 50 ppm |
| Si | 150 ppm |
| on the re-melted region | |
| Fe | 2 ppm |
| Si | 8–9 ppm | which corresponds to purification coefficients of 275 in respect of iron and 73 in respect of silicon, in relation to 30% of the initial mass of aluminum, that being in spite of the difficulties involved in applying the process to small amounts. The very steep gradient of concentration in respect of iron and silicon in the layer of large crystals should also be noted, which, in comparison with the above-discussed French patent, shows the high level of efficiency in regard to causing re-melting of the lower part of the purified mass. The impurities concentration moreover increase very rapidly as the top of the layer of large crystals is approached.

EXAMPLE 2

An industrial operation was carried out using one ton of aluminum with the same proportions of iron and silicon as in Example 1. The layer of large crystals, at the end of the operation, represented 20% of the total mass, while the re-melted region corresponded to 50% of the total mass.

The results obtained by spectrographic analysis were as follows:

| on the large crystals | |
|---|---|
| Fe | 4 ppm |
| Si | 20 ppm |
| on the re-melted region | |
| Fe | 1 ppm |
| Si | 3 ppm |

Therefore, at the same time as achieving a yield of 20%, this operation gave purification coefficients of 137 in respect of iron and 31 in respect of silicon, while with a yield of 40%, the coefficients were 183 for iron and 69 for silicon, that is to say, for 70% of the product recovered, the purification coefficients were respectively 168 and 52.

The above-specified results show the very high level of efficiency of the novel process, in comparison with the processes known hitherto.

EXAMPLE 3

The same process was applied to metals and alloys other than aluminum, for example lead and zinc.

In the case of zinc, with the addition of about 1000 ppm of aluminum, the analysis results were as follows:
- on the re-melted region, representing 30% of the initial mass, the proportion of Al was less than 50 ppm;
- in the large crystal region, representing 20% of the total mass, the proportion of Al was between 50 and 100 ppm.

It can, therefore, be seen that the process according to the invention has a very high level of efficiency, in comparison with the prior art processes.

The process can also be applied to types of aluminum other than those given by way of example, for example those which are set forth in the standards of the Aluminum Association under the general designations 1000, 1100 and 1200, such as 1050, 1230, etc.

The process may also be applied to a metal which has already been previously purified in part, using any known procedure. Such preliminary partial purification may have been in respect of the peritectic elements present, such as for example titanium and vanadium, which can be removed from aluminum in known manner by a boron treatment.

I claim:

1. A process for purifying a volume of liquid metal by fractional crystallization, said process comprising:
   (a) cooling a portion of said liquid metal in the upper part of said volume to cause the formation of small metal crystals and a liquid metal containing concentrated impurities;
   (b) compacting said small crystals to form a layer of large metal crystals wherein the layer contains virtually no liquid metal;
   (c) remelting a portion of the large crystals in said layer to form purified liquid metal in the lower part of said volume;
   the rates of said cooling, compacting and remelting being adjusted such that an unbroken layer of large crystals is maintained between the liquid metal containing concentrated impurities in the upper part of said volume and the purified liquid metal in the lower part of said volume such that there is no direct exchange between the purified liquid metal and the liquid metal containing concentrated impurities.

2. A purification process according to claim 1 characterized in that said metal is aluminum.

3. A purification process according to claim 1 characterized in that said metal is a metal selected from the group consisting of zinc, lead, magnesium and silicon.

4. A purification process according to claim 1 characterized in that said metal is a metal which has been previously partially purified.

5. A purification process according to claim 4 characterized in that said metal is a metal which has been previously purified in respect of its peritectic impurities.

6. A purification process according to claim 1 characterized in that said metal is aluminum which has been previously purified in respect of its peritectic impurities.

7. A purification process according to claim 1 wherein melting of the large crystals and growth of the layer by compaction occur at a commensurate rate.

* * * * *